UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

AZO DYE.

SPECIFICATION forming part of Letters Patent No. 525,657, dated September 4, 1894.

Application filed July 6, 1894. Serial No. 516,722. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of a New Azo Coloring-Matter, of which the following is a specification.

My invention relates to a new azo-dyestuff which can be obtained from diazo-para-nitranilin and dialkyl-meta-sulfanilic acid. Dialkyl-meta-sulfanilic acid does not combine with the diazo-compounds from anilin, toluidin, xylidin and the like or only with great difficulty, but I have discovered that it can be made to combine most readily with the diazo-compound of para-nitro-anilin and that the new dye so obtained is characterized by most valuable properties in that it combines a great resistance against the action of light, acids and washing with unsurpassed equalizing properties. It dyes wool from the acid bath giving red shades and possesses the following characteristics: It occurs as a crystalline powder soluble in water giving red solutions from which a brownish precipitate separates on the addition of hydrochloric acid; it is also precipitated from its aqueous solution by caustic alkalis, in the form of a red or brownish-red crystalline precipitate; it dissolves in concentrated sulfuric acid giving a red to reddish yellow solution; it is soluble in alcohol giving yellow-red solutions, and practically insoluble in benzene and ether.

Its composition is represented by the following formula:

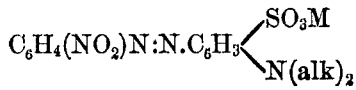

where M stands for an equivalent of a metal, such as sodium and alk. indicates alkyl.

The following example will serve to illustrate the manner in which my invention can best be carried into practical effect and my new dye obtained: Prepare a diazo-solution in the usual way from about thirteen and four fifths (13⅘) parts of para-nitro-anilin and run this into a solution of about twenty-five (25) parts of the sodium salt of dimethyl-meta-sulfanilic acid, about fifty (50) parts of crystallized sodium acetate in about five hundred (500) parts of water. Stir while mixing and continuously for about three (3) hours more. The dye separates out as a crystalline precipitate. Filter, press and dry.

An equivalent product is obtained if in the above example the di-methyl-meta-sulfanilic acid (sodium salt) is replaced by the equivalent quantity of the corresponding di-ethyl-compound, and under the term alkyl in this specification I include ethyl and methyl.

Now, what I claim is—

The new azo-dye which can be derived from para-nitraniline and dialkyl-meta-sulfanilic acid and which possesses the formula

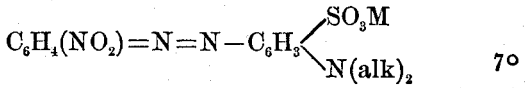

and which occurs as a crystalline powder, soluble in water and alcohol precipitated from its aqueous solution by hydrochloric acid and by caustic alkalis, and gives a red to reddish-yellow solution in concentrated sulfuric acid and is practically insoluble in ether and benzene.

In testimony whereof I have hereunto set my hand in the presence of two subscribing witnesses.

PAUL JULIUS.

Witnesses:
ERNEST F. EHRHARDT,
ADOLPH REUTLINGER.